March 24, 1931.  J. C. VAN BERKEL  1,797,887

SLICING MACHINE

Original Filed April 26, 1928

Inventor:
Johannes C. van Berkel
By Nissen & Crane Attys.

Patented Mar. 24, 1931

1,797,887

UNITED STATES PATENT OFFICE

JOHANNES C. VAN BERKEL, OF COPENHAGEN, DENMARK

SLICING MACHINE

Application filed April 26, 1928, Serial No. 272,954, and in Germany May 9, 1927. Renewed January 17, 1931.

This invention relates to slicing machines, particularly the type having a rotary knife and work table. The advantages of this form of machine over a machine having a reciprocating work table consists in lower energy consumption and a higher efficiency. Furthermore, a circular rotatable table can be equipped with a plurality of meat fastening devices so that a machine of this type may operate at a higher speed.

The disadvantage of this form of machine, however, is that the table tends to wabble because it is supported in the center only.

One object of this invention is to overcome this defect by providing a table which is supported entirely or partly at its outer edge, particularly at the point where the cutting takes place. In this manner, the cutting pressure of the knife may be absorbed directly so that the work table is relieved of strains and may be operated with greater safety.

Figure 1:
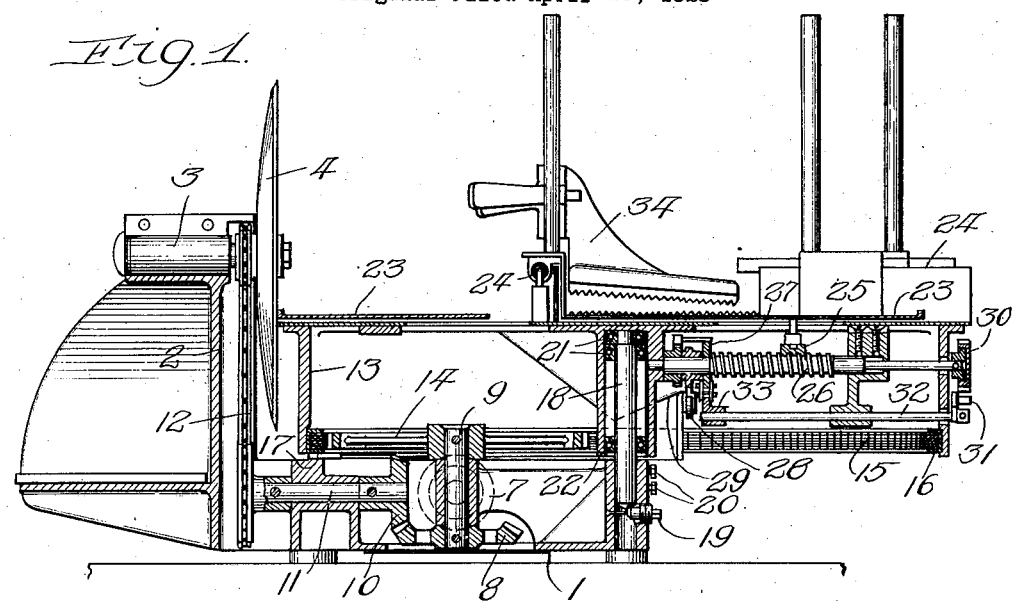
Figure 2:
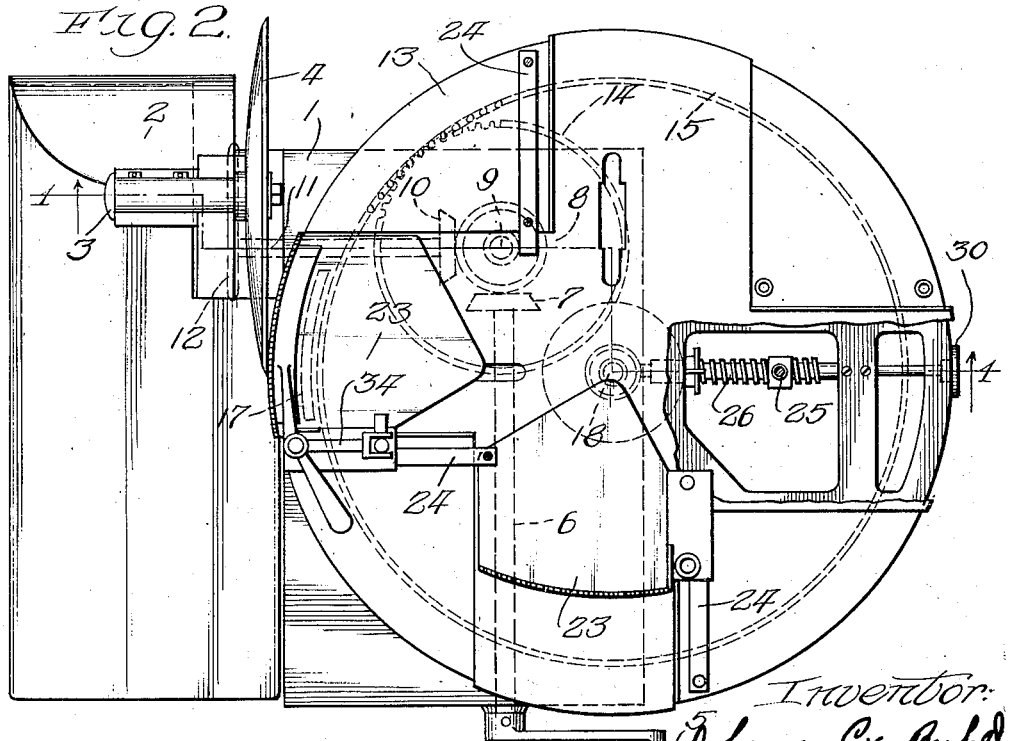

Fig. 1 is a longitudinal section of the machine substantially on line 1—1 of Fig. 2; and Fig. 2 is a plan view of the machine.

The slicing machine is supported on a base frame 1 which carries a bracket 2 in which the shaft 3 of the knife 4 is journalled. The machine is driven by a hand crank 5 which rotates the horizontal driving shaft 6. At the end of the driving shaft 6 is a bevel gear 7 which meshes with a bevel gear 8 on the vertical driving shaft 9. The drive of the knife 4 consists of a bevel gear 10 mounted on the short shaft 11 and meshing with the bevel gear 8, and a sprocket wheel carrying a chain 12 is mounted on the other end of the shaft 11.

The drive of the rotatable work table consists of a spur gear 14 rigidly connected with the bevel gear 8 and in mesh with a chain 15 arranged on a flange or skirt portion of the work table 13. The chain 15 is arranged within a channel bar 16 secured at the lower end of the inner wall of the work table 13. The lower flange of the channel bar 16 rests on the track 17 of the base frame 1 in order to support the table 13 against the pressure of the knife. The track 17 may extend around the entire circumference of the table or it may extend over a portion of the circumference adjacent the knife, as shown in the drawings. The track 17 may be rendered frictionless by applying rollers, or the like, or, as shown in the drawing, by means of a plate of fibre.

The work table 13 is rotatable about a pin 18 which is adjustably mounted in the base frame 1. This adjustment is accomplished by means of a conical adjusting screw 19 coacting with the conical end of the pin 18. This vertical adjustment of the pin 18 simultaneously adjusts the bearing pressure of the table 13 on the track 17. The pin 18 may be locked by set screws 20 after the desired adjustment is made.

The work table 13 preferably is mounted by means of ball bearings 21, 22 on the pin 18, said ball bearings being adapted to take up vertical and horizontal pressure. The work table 13 is provided with four slides 23 of which two only are shown in the drawing. The slides are movable along the rods 24 about which they may be tilted. Each slide 23 engages a feed spindle 26, journaled below the work table, through a segmental nut 25. The feed spindle is operated by a feeding device 27 whose feed lever is provided with a roller 28 which travels once during each rotation about the inclined plane 29. A hand wheel 30 is provided to render the feed spindle 26 manually adjustable.

The feed is controlled by a small hand crank level 31 which adjusts a shaft 32. At the end of the shaft 32, an eccentric 33 is secured, which may be so positioned that the feed pawl is in engagement with the feed wheel a longer or shorter time, as may be desired. The construction of this part of the feeding device is well known and need not further be described.

Each slide 23 of the work table 13 is provided with a meat clamping device 34, which is of well-known construction, and is adjustable, as is also well-known in the art. The manual drive of the machine obviously may be replaced by a motor drive which may be connected with the knife.

I claim:—

1. In a slicing machine having a rotating slicing knife and a work table mounted to rotate so that the periphery of said table moves past the cutting edge of said knife, mechanism for continuously rotating said table, and means for supporting said table near its outer edge to prevent movement thereof away from the cutting portion of the knife edge.

2. In a slicing machine having a rotating slicing knife and a work table mounted to rotate so that the periphery of said table moves past the cutting edge of said knife, mechanism for continuously rotating said table, a support for supporting the outer edge of said table, and means adjustable to vary the pressure of said table on said support.

3. In a slicing machine having a rotating slicing knife and a work table mounted to rotate its periphery past the cutting edge of said knife, driving mechanism for rotating said table, co-operating driven means on the outer edge of said table, and a support positioned adjacent said driven means to resist movement of the table away from the cutting portion of said knife and for supporting the outer edge of said table.

4. In a slicing machine having a slicing knife and a work table, an upright shaft upon which said table is journaled, gear teeth receiving means adjacent the periphery of said table, driving mechanism having a gear meshing with said means to rotate said table past the cutting edge of said knife, said gear teeth being arranged on the periphery of a flange extending around said table and concentric with said shaft.

5. In a slicing machine having a slicing knife and a work table, an upright shaft upon which said table is journaled, gear teeth receiving means adjacent the periphery of said table, driving mechanism having a gear meshing with said means to rotate said table past the cutting edge of said knife, and a track upon which the outer edge of said table rests for preventing movement of said table away from the cutting portion of said knife due to the force exerted by said knife during the cutting operation.

6. In a slicing machine having a slicing knife and a work table, an upright shaft upon which said table is journaled, gear teeth receiving means adjacent the periphery of said table, driving mechanism having a gear meshing with said means to rotate said table past the cutting edge of said knife, and means adjustable to raise or lower said shaft to vary the pressure of said table on said track.

7. In a slicing machine having a rotating slicing knife, a work table comprising a work-carrying portion and a skirt portion extending downwardly from the periphery of said work-carrying portion, an upright shaft upon which said table is journaled, gear teeth receiving means on said skirt portion, driving mechanism having a gear meshing with said means to rotate said table past the cutting edge of said knife, and a track disposed under said skirt portion to support said table.

8. In a slicing machine having a rotating slicing knife, a work table comprising a work-carrying portion and a skirt portion extending downwardly from the periphery of said work-carrying portion, an upright shaft upon which said table is journaled, gear teeth receiving means on said skirt portion, driving mechanism having a gear meshing with said means to rotate said table past the cutting edge of said knife, and work feeding mechanism carried by said table below said work-carrying surface and within said downwardly extending skirt portion.

9. In a slicing machine having a rotating slicing knife, a work table comprising a work-carrying portion and a skirt portion extending downwardly from the periphery of said work-carrying portion, an upright shaft upon which said table is journaled, gear teeth receiving means on said skirt portion, driving mechanism having a gear meshing with said means to rotate said table past the cutting edge of said knife, and means adjustable to raise and lower said shaft to vary the pressure of said table on said track.

10. In a slicing machine having a rotating slicing knife, a work table comprising a work-carrying portion and a skirt portion extending downwardly from the periphery of said work-carrying portion, an upright shaft upon which said table is journaled, a channel bar carried by said skirt portion, a chain in said channel bar, driving mechanism having a gear engaging said chain to rotate said table past the edge of said knife, and a track upon which said channel bar is supported.

11. In a slicing machine having a rotating slicing knife, a work table comprising a work-carrying portion and a downwardly extending skirt portion, work feeding mechanism carried by said table below said work-carrying surface and within said downwardly extending skirt portion.

12. A slicing machine comprising a slicing knife, a rotatable table, a plurality of substance supporting carriages on said table, a feeding mechanism for each carriage disposed beneath said table, and means for automatically actuating said feeding mechanism to advance the carriage to which it is connected when said table is rotated past a predetermined position.

13. A slicing machine comprising a slicing knife, a table, a plurality of carriages slidably mounted on said table, means for moving said table past said slicing knife to bring each of said carriages successively past said slicing knife, and automatically feeding means for feeding said carriages as said carriages pass a predetermined position, said feeding means being disposed beneath said table and substantially concealed thereby.

In testimony whereof I have signed my name to this specification on this 27th day of January A. D. 1928.

JOHANNES C. van BERKEL.